US006952739B2

(12) United States Patent
Fritz et al.

(10) Patent No.: US 6,952,739 B2
(45) Date of Patent: Oct. 4, 2005

(54) METHOD AND DEVICE FOR PARAMETER INDEPENDENT BUFFER UNDERRUN PREVENTION

(75) Inventors: Rolf Fritz, Waldenbuch (DE); Markus Michael Helms, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 728 days.

(21) Appl. No.: 09/900,407

(22) Filed: Jul. 6, 2001

(65) Prior Publication Data

US 2002/0016850 A1 Feb. 7, 2002

(30) Foreign Application Priority Data

Aug. 3, 2000 (EP) ........................................... 00116740

(51) Int. Cl.[7] .................................................. H04J 1/16

(52) U.S. Cl. ........................... 709/232; 710/56; 710/58; 710/59; 370/230; 370/235

(58) Field of Search ................................ 709/231, 232; 370/229, 230, 235, 238; 710/56–60, 29, 52

(56) References Cited

U.S. PATENT DOCUMENTS 5,765,187 A 6/1998 Shimizu et al. ............. 711/110
5,778,175 A 7/1998 Paul et al. ............... 395/200.8
5,982,778 A * 11/1999 Mangin et al. ............. 370/445
6,138,189 A * 10/2000 Kalkunte ..................... 710/53
6,408,349 B1 * 6/2002 Castellano ................... 710/56
6,556,568 B2 * 4/2003 Sasaki ..................... 370/395.1
6,665,728 B1 * 12/2003 Graumann et al. ......... 709/232
6,678,243 B2 * 1/2004 Sartain et al. .............. 370/229
6,715,007 B1 * 3/2004 Williams et al. .............. 710/52

* cited by examiner

*Primary Examiner*—Jeffrey Pwu
(74) *Attorney, Agent, or Firm*—Lynn L. Augspurger; James E. Murray

(57) ABSTRACT

A method and device for parameter independent buffer underrun prevention in a data communication system includes a buffer for compensating for a difference in the rate of flow of data having a write port and a read port. After a commencement of writing data into the buffer, a predetermined delay time occurs. When the delay time has passed, reading data out from the buffer starts. Then the length of a time gap between the completion of writing data into the buffer and completion of reading data out from the buffer is determined. Finally, the length of the predetermined delay time is decreased by a first value if the length of the time gap is larger than a specified tolerance value and the length of the predetermined delay time is increased by a second value if the length of the time gap is smaller than the specified tolerance value. The provided method and device advantageously adjusts to systems having dynamically varying parameters, e.g., processors or other devices having a variable clock rate due to power-saving-modes.

1 Claim, 2 Drawing Sheets

METHOD AND DEVICE FOR PARAMETER INDEPENDENT BUFFER UNDERRUN PREVENTION

FIELD OF THE INVENTION

The present invention relates generally to computer systems, network components and telecommunication devices. More particularly, the present invention relates to a method and a device for parameter independent buffer underrun prevention in a data communication system.

BACKGROUND OF THE INVENTION

A data communication system is a system or facility capable of providing information transfer between persons and equipment. The system usually consists of a collection of individual communication networks, transmission systems, relay stations, tributary stations, and terminal equipment capable of interconnection and interoperation so as to form an integrated whole. These individual components normally serve a common purpose, are technically compatible, employ common procedures, respond to some form of control, and generally operate in unison. Data communication systems can also be formed by a hardware connector used to link to other devices, or a convention used to allow communication between two software systems. Furthermore, such systems might be composed of several discrete units or devices or it might be integrated on one single semiconductor device.

When transferring data from one device to another through a data communication system, there might be differences in the rate of flow of data, in the time of an occurrence of events or in the size of blocks of data.

In order to compensate for such a difference a routine or storage is used generally referred to as a buffer. Hence, buffers are used to decouple processes so that a reader and a writer may operate at different speeds or on different sized blocks of data. The speed or the different sized blocks of data can be specified by parameters, e.g., incoming and outgoing bit rate, data width, block size, packet size.

Typically, a buffer will have additional attributes such as an input pointer, where new data will be written into the buffer, and output pointer, where the next item will be read out from and/or a count of the space used or free. Furthermore, there are many different algorithms for using buffers, e.g., first-in first-out (FIFO or shelf), last-in first-out (LIFO or stack), double buffering, i.e., allowing one buffer to be read while the other is being written and cyclic buffer, i.e., reading or writing past the end wraps around to the beginning.

While the use of buffers makes it possible to decouple processes so that a reader and a writer may operate at different speeds or on different sized blocks of data, they might be the reason for unwanted exceptional situations. One is called "buffer overflow". This is what happens when it is tried to store more data in a buffer than it can handle. This may be due to a mismatch in the processing rates of the producing and consuming processes, or because the buffer is simply too small to hold all the data that must accumulate before a piece of it can be processed. For example, in a text-processing tool that crunches a line at a time, a short line buffer can result in a loss as input from a long line overflows the buffer and overwrites data beyond it. Therefore, additional measures need to be applied that check for overflow on each character and stop accepting data when the buffer is full.

Another unwanted exceptional situation is called "buffer overrun". This is a frequent consequence of data arriving faster than it can be consumed, especially in serial line communications. For example, a communication line operated at 9600 baud, there is almost exactly one character per millisecond, so if a silo can hold only two characters and the machine takes longer than 2 milliseconds to get to service the interrupt, at least one character will be lost. However, the opposite, called "buffer underrun", also must be avoided in order to ensure data integrity. This occurs when data are read faster from the buffer than written into it. Thus, additional precautionary measures must be taken.

From U.S. Pat. No. 5,765,187 an overrun and underrun detection circuit is known. The circuit detects a situation in which an overrun or an underrun will occur in the buffer area in response to the write address indicated by a write pointer and a read address indicated by a read pointer. A control part disables the data from being written into and read out from the buffer area when the overrun and underrun detection circuit detects the situation. Therefore, a receiving ring buffer control mechanism in a parallel computer system is provided in which a plurality of processors is connected to each other via a network. Each processor comprises a main memory having a buffer area serving as a receiving buffer. Data are applied to the main memory via a bus. A write pointer is coupled to the main memory for indicating a write address of the buffer area and a read pointer is coupled to the main memory for indicating a read address of the buffer area. An overrun and underrun detector is coupled to the write pointer and the read pointer for detecting a situation in which an overrun or an underrun will occur in the buffer area in response to the write address indicated by the write pointer and the read address indicated by the read pointer. Furthermore, a single DMA controller is coupled to the main memory and the overrun and underrun detector for preventing the data from being written into and read out from the buffer area when the overrun and underrun detector detects the situation.

U.S. Pat. No. 5,778,175 discloses a method implemented by a computer network adapter for automatic retransmission of any packet involved in an unsuccessful transmission attempt due to transmit buffer underrun conditions. The method entails the steps of stopping the transmission and retrying another transmission of the packet for up to a predetermined number of attempts with an increased transmit threshold. The transmit threshold is the number of bytes of data of the packet involved in the transmission that are stored in the transmit buffer prior to start of transmission. Preferably, for the initial transmission attempt, the adapter requires only a small number of bytes of the packet to be stored in the transmit buffer. After occurrence of a buffer underrun condition, the adapter attempts a retry in accordance with the algorithm only after a substantially larger portion of the packet has entered the transmit buffer for transmission. If any retry succeeds, the adapter need not issue an interrupt.

Both known approaches cause a delay in the data transmission. Either the data transfer is stopped when a buffer underrun has been detected or the transmission is retried up to a certain number of times to overcome the underrun condition.

OBJECT OF THE INVENTION

Starting from this, the object of the present invention is to provide a method and a device for parameter independent buffer underrun prevention in a data communication system with an improved overall data transfer rate, i.e., a reduced latency.

BRIEF SUMMARY OF THE INVENTION

The foregoing object is achieved by a method and a system for parameter independent buffer underrun prevention in a data communication system comprising a buffer for compensating for a difference in the rate of flow of data having an input port for writing data into the buffer and an output port for reading data from the buffer. After a commencement of writing data into the buffer, a predetermined delay time occurs. When the delay time has passed reading data out from the buffer is started. Then the length of a time gap between the completion of writing data into the buffer and completion of reading data out from the buffer is determined. Finally, the length of the predetermined delay time is decreased by a first value if the length of the time gap is larger than a specified tolerance value and the length of the predetermined delay time is increased by a second value if the length of the time gap is smaller than the specified tolerance value.

Thus, the method and the device according to the present invention manipulate the delay time via feedback control in a way, that it gets permanently decreased, to minimize latency, i.e., the period of time that data is held by a device before it is forwarded, or increased, to prevent buffer underrun. The delay time can be implemented as a number of delay cycles, which gets permanently decreased, as long as there is not the dangerous case, when the next decrease of the delay time would cause a buffer underrun, i.e., when the time gap is smaller than the specified tolerance value.

One major advantage of the method and device is that it adjusts to systems having dynamically varying parameters. Therefore, the present invention can advantageously be implemented in processors or other devices having a variable clock rate or transmission rate, e.g., due to power-saving-modes.

The above, as well as additional objectives, features and advantages of the present invention, will be apparent in the following detailed written description.

BRIEF DESCRIPTION OF THE SEVERAL VIEWS OF THE DRAWINGS

The invention, however, as well as a preferred mode of use, further objectives, and advantages thereof, will best be understood by reference to the following detailed description of an illustrative embodiment when read in conjunction with the accompanying drawings, of which.

DETAILED DESCRIPTION OF THE INVENTION

Figure 1:
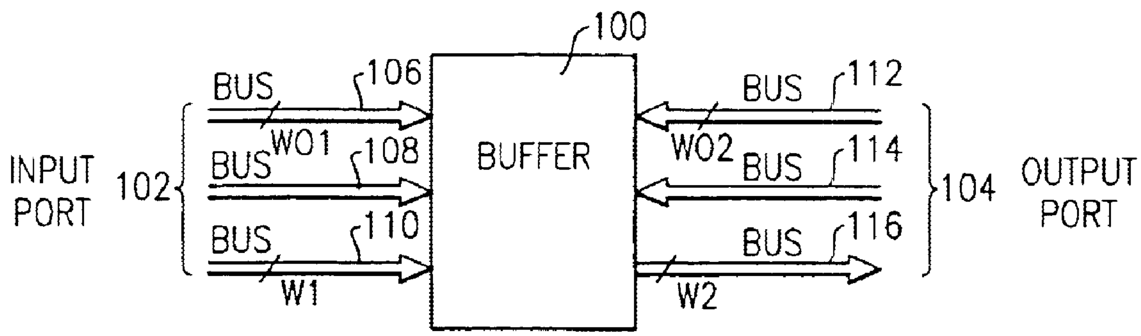
FIG. 1 is a general view of a buffer to be used in accordance with the present invention.

FIG. 1 contains a general view of a buffer 100 having an input port 102 and an output port 104. The input port 102 consists of a write address bus 106, a write enable signal 108 and a write data bus 110. The write address bus 106 comprises a plurality of conductors used for transmitting write address signals, i.e., to specify a particular write address to write data to. The number of conductors is w01, where w01 is an integer number greater than one. The write data bus 110 comprises one or more than one conductors used for transmitting write data signals concurrently. The quantity of conductors is called w1, whereby w1 is an integer number greater than one or equal to one. Furthermore, the data is written into the buffer 100 with a write frequency f1.

The bandwidth of a given port or communication facility is the amount of data that can be sent through that given port or communications facility per second. Therefore, the input port bandwidth b1 is formed by the product of the quantity w1 of conductors forming the write data bus 110 and the write frequency f1, i.e., b1=w1×f1. Depending on a protocol used for data transmission, there might be an additional write delay d1 due to specified breaks in the data transfer. Therefore, the actual input port bandwidth b1 might be reduced in relation to the additional write delay d1.

The output port 104 comprises a read address bus 112, a read enable signal 114 and a read data bus 116. The read address bus 112 consists of several conductors used for transmitting address signals, i.e., to specify a particular address to read data from. The number of conductors is w02, where w02 is an integer number equal to one or greater than one. Furthermore, w02 has the same number of conductors w01 as the write address bus 106 of the input port 102.

The read data bus 116 consists of at least one conductor used for reading data signals concurrently from the buffer 100. The number of conductors is w2, where w2 is an integer number greater than one or equal to one. Furthermore, the data are read out from the buffer with a frequency f2. The bandwidth b2 of the output port 104 is formed by the product of the quantity w2 of conductors forming the read data bus 116 and the read frequency f2, i.e., b2=w2×f2. Depending on a protocol used for data transmission, there might be an additional read delay d2 due to specified breaks in the data transfer. Therefore, the actual output port bandwidth b2 might be reduced according to the additional read delay d2.

Figure 2:
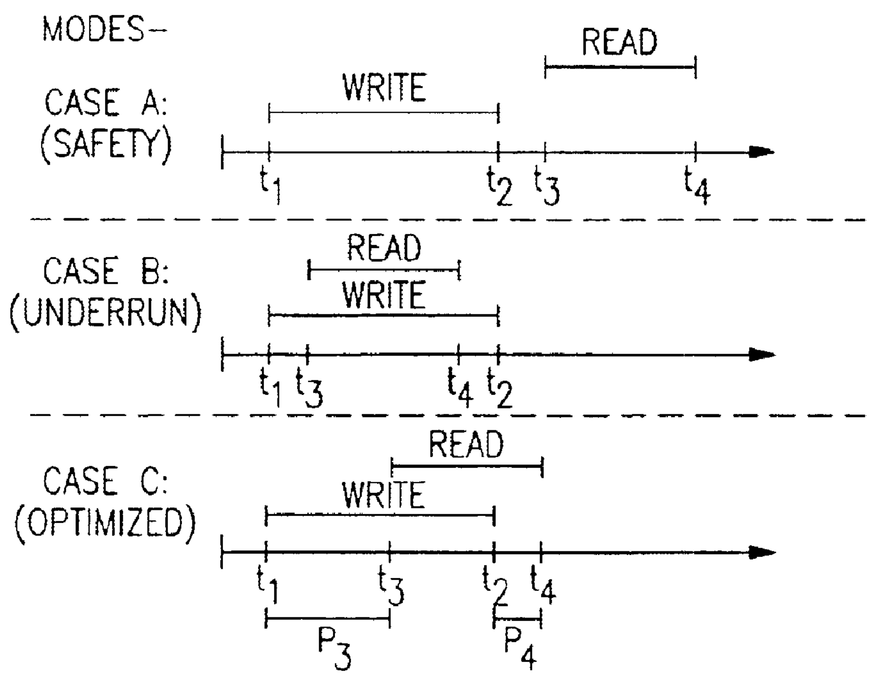
FIG. 2 is a diagram illustrating three scenarios of operation of the buffer according to FIG. 1.

FIG. 2 is a diagram illustrating three scenarios of operation of the buffer according to FIG. 1 called case A, case B and case C. It is assumed that the input port bandwidth b1 is smaller than the output port bandwidth b2.

For a transfer of a specific amount of data m0, the period of time needed to fill the buffer is p1=d1+m0/b1. To read out the same amount of data m0, the period of time needed is p2=d2+m0/b2. Additionally, it is assumed that the period of time p1 to fill the buffer is larger than the period of time p2 to read the buffer. In all cases an instant of time t1 indicates a commencement of writing into the buffer and instant of time t2 indicates a completion of writing into the buffer, whereas instant of time t3 indicates a commencement of reading from the buffer and instant of time t4 indicates a completion of reading from the buffer.

Case A shows a safety mode. The instant of time t3, when the read process begins is later or equal to the instant of time t2, when the write process has finished. This mode is safe, because despite the higher output port bandwidth b2 an underrun condition can never occur. The safety mode, however, has the disadvantage of a high latency, i.e., the delay time is greater than the period of time needed to write the buffer.

Case B shows a buffer underrun situation that should be avoided. The read process start at time t3 is so early that the read process ends at time t4 before the time t2 when all data are written into the buffer. Thus, the read process reads out false data.

Still referring to FIG. 2, case C shows an optimized mode of operation according to the present invention. The read process starts at an instant of time t3, before time t2 when all write data has been written into the buffer. However, the start of the read transfer is chosen so that the end of the read transfer at time t4 is after the end of the write transfer at time t2. Since the mentioned times have to be whole-numbered multiples of a cycle time, there is a first period of time p4 at the end. Hence, in case C the latency p3, i.e., the period of time that passes before the input data get forwarded, is reduced, still avoiding an underrun condition as depicted in case B.

Figure 3:
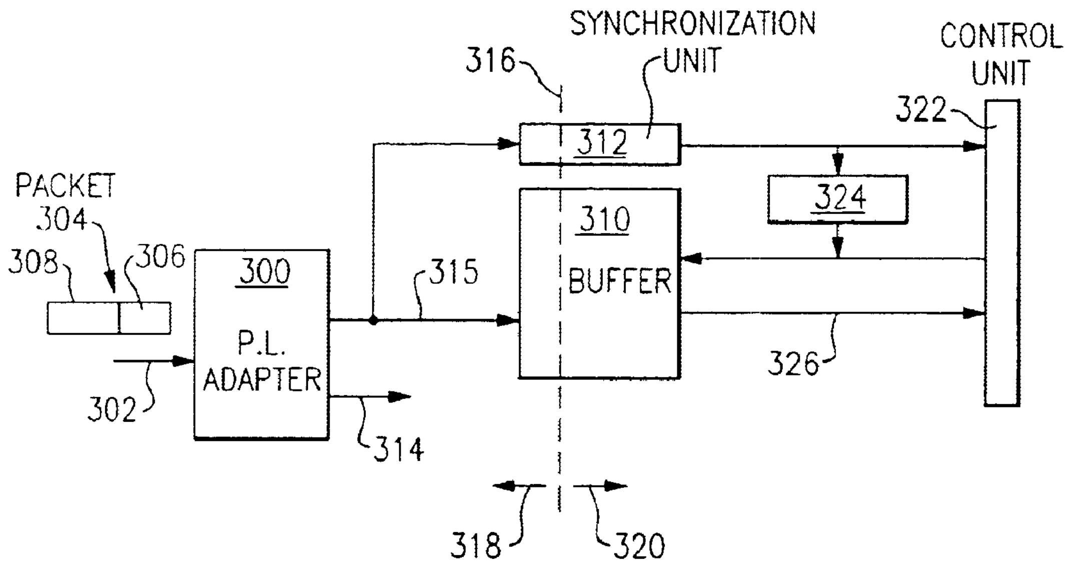
FIG. 3 is a high level block diagram of a data communication system to be used according to the present invention.

FIG. 3 depicts a high level block diagram of a data communication system to be used according to the present invention. An physical layer adapter 300 provides a physical layer interface 302 for communication with an incoming data line of a connected network (not shown). The incoming data line transports a packet 304, of data sent across a network, having a header portion 306 and a data portion 308, also called payload. The header portion 308 includes control information about the packet 304, e.g., source and destination addresses, error checking fields and packet size. The data portion contains the actual data to be transferred over the network and through the data communication system respectively.

Furthermore, the physical layer adapter 300 provides a service for a buffer 310 and a synchronization unit 312. Additionally, it generates a clock signal 314 corresponding to the bit rate of the incoming data. The physical layer adapter 300 supplies the synchronization unit 312 with control information taken from the header portion 306 of the packet 304. The buffer 310 receives data to be buffered from the physical layer adapter 300 via a write port 315 at a speed determined by the clock signal 314.

Within the buffer 310 and the synchronization unit 312 a change in processing frequencies is performed, as indicated by the broken line 316. On one side of the broken line 316 indicated by arrow 318 processing takes place at the speed of the clock signal 314, whereas on the other side of the broken line 316 indicated by arrow 320 data get processed at a higher speed.

The synchronization logic 312 forwards control information to a control unit 322 and an underrun prevention unit 324, whereby the underrun prevention unit might only need a subset of the control information forwarded by the synchronization unit 312. The control unit 322 controls a read port 326 of the buffer 310. However, the underrun prevention unit 324 controls the delay between the start of a write access to the buffer's write port 315 and the start of a read access via the buffer's read port 326.

Whenever a data packet 304 arrives on the physical layer interface 302 the physical layer adapter 300 generates the clock signal 314 and a receive data stream to be forwarded to the write port 315 of the buffer 310. The control information gets extracted from the header 306 of the packet 304 and synchronized to a read clock rate determined by the control unit 322. The content of the data portion 308 of the packet 304 is written into the buffer 310 with a receive clock rate corresponding to the clock signal 314. For reading the data from the buffer 310 the read clock rate generated by the control logic 322 is used. After the commencement of writing data into the buffer 310, the underrun prevention unit 324 determines a delay time wait. When the delay time has passed reading data from the buffer is started. Then the length of a time gap between the completion of writing data into the buffer and completion of reading data from the buffer is determined. Finally, the length of the predetermined delay time is decreased by a first value if the length of the time gap is larger than a specified tolerance value and the length of the predetermined delay time is increased by a second value if the length of the time gap is smaller than the specified tolerance value.

Figure 4:
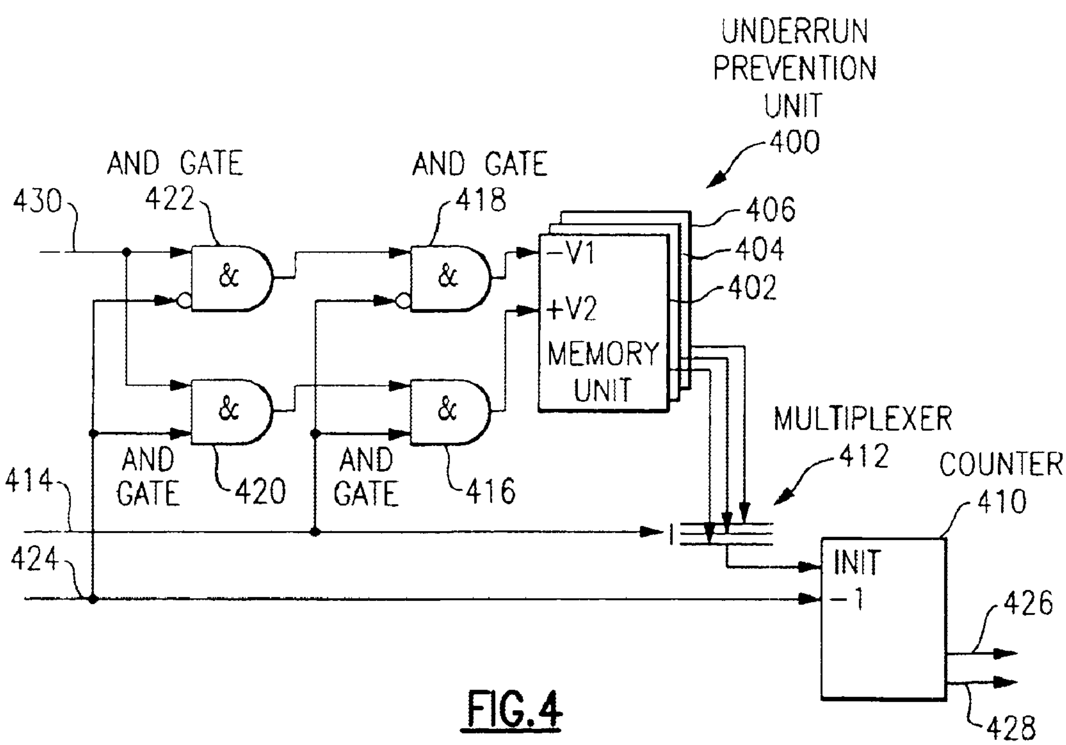
FIG. 4 is a block diagram of an underrun prevention unit according to the present invention.

FIG. 4 depicts a block diagram of an underrun prevention unit 400 according to the present invention. The underrun prevention unit 400 includes a first, a second and a third memory unit 402, 404, 406 for storing different predetermined delay values. The delay values are coded as a number of cycles, whereby one cycle corresponds to one period of a system clock. Each delay value stored in one of the memory units 402 to 406 can be forwarded to a counter 410 for measuring a particular predetermined delay time in correspondence to the delay value. The delay value gets forwarded via a multiplexer 412 combining signal lines coming from the memory units 402 to 406 for transmission to the counter 410 that is shared among the memory units 402 to 406. A different memory unit 402 to 406 is selected in correspondence to the amount of data to be buffered. In other words, data packets to be buffered are classified according to the amount of data they contain. Each packet size class is assigned to one particular memory unit 402 to 406. A class signal 414 controls the multiplexer 412 to determine which delay value stored in the memory units 402 to 406 is to be forwarded to the counter 410.

Furthermore, the class signal 414 also selects the delay value to be manipulated by selecting the particular memory unit 402 to 406. However, in place for the memory units 404 and 406, a selection unit is shown for selecting memory unit 402. The contents of the memory unit 402 can be modified, i.e., decreased and increased, by a control logic as indicated with a minus operator "−" and a plus operator "+" in FIG. 4. The control logic is able to decrease the contents of the memory unit by a first value v1 or to increase it by a second value v2.

The selection unit consists of a first and a second AND gate 416 and 418. The first AND gate 416 is connected with one input terminal to the class signal 414 and with another to the output terminal of a third AND gate 420. The output terminal of the first AND gate 416 is connected to a control logic increasing the delay value coded in cycles and stored in the first memory unit 402 by the second value v2, e.g., one cycle. The second AND gate has its first input terminal also connected to the class signal 414, whereas its second input terminal is connected to the output terminal of a fourth AND gate 422. The output terminal of the second AND gate 418 is connected to a control logic decreasing the delay value coded in cycles and stored in the first memory unit 402 by the first value v1, e.g., one cycle.

In another embodiment the first and second values v1 and v2 are chosen to be greater than one. This speeds up the iterative process of reaching an optimum value stored in the respective memory units 402 to 406. It is also practical to start with relatively large values v1 and v2 that gets lessened, e.g., halved, from one iterative step to the next until the respective value has reached one.

A write signal 424 is connected to the counter 410. Whereas the delay value forwarded by the multiplexer 412 is used to initialize the counter 410, the write signal indicates that the counter is counted down one by one as long as the write signal is active, i.e., as long as data are written into the buffer (not shown). The counter 410 has a first and a second output terminal 426 and 428. The first output terminal 426 is active as long as the counter keeps a value greater than one, whereas the second output terminal 428 becomes active only when the counter has reached zero. In case the first output port 426 of the counter 410 is active, a read access to the buffer gets delayed, i.e., it waits until more data have been written into the buffer. In case the second output port 428 of the counter 410 becomes active, the read access is started, i.e., the data get forwarded.

The write signal 424 together with an end-of-read signal 430 control whether the delay value stored in the memory units 402 to 406 is increased or decreased. However, only the particular value gets modified that is selected by the class signal 414. Therefore, the end-of read signal 430 is connected to one input port of each of the third and fourth AND gate 420 and 422. The write signal 424 is directly connected to another input port of the third AND gate 420 and over an inverting input port to the fourth AND gate 422.

The end-of-read signal 430 becomes active a specified number of cycles before all data have been read out from the buffer. The number of cycles specifying a tolerance time.

In case the end-of-read signal 430 becomes active while the write signal is still active, the third AND gate 420 becomes active and the delay value of the selected memory unit gets increased. In contrast, if the end-of-read signal 430 gets active when the write signal is already inactive, the fourth AND gate 422 becomes active and the delay value of the selected memory unit is decreased. Therefore, the third and fourth AND gates 420 and 422 function as means for determining the length of a time gap between the completion of writing data into the buffer and completion of reading data from the buffer. More particular, the third and fourth AND gates 420 and 422 detect whether or not the end-of-read signal occurs after the completion of writing into the buffer or while the writing into the buffer is still going on.

When the underrun prevention unit is set into operation the delay value in each class is initialized to a relatively high value, based on worst case conditions. Then with every data transfer the settings are automatically adapted until they have reached the optimum value.

Furthermore, the physical layer adapter 300 is able to generate dummy-transfers during periods of no traffic based on a detecting unit, that measures the time of no traffic. The dummy transfers will transfer data to a destination that just drops the data. These dummy transfers ensure, that the feedback control is always correcting the reference value, even if one of the parameters w1, f1, w2, f2, m0, d1, d2 or the tolerant value changes during that no-traffic-period. Especially in the case of a switch to a power-saving-mode, that is executed as a consequence of the no-traffic-situation, the dummy transfers will hold the system in an always safe mode.

In another embodiment of the present invention addition the number of additional delay d1 on the received data stream gets normalized to the own frequency f2 and subtracted from a maximum value of an allowed delay. In this way the number of cycles before end of reading is optimized. The end-of-read signal might raise shortly before the end of transfer, but far enough to manipulate the reference value in a save way.

The present invention can be realized in hardware, software, or a combination of hardware and software. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

Further advantages of the present invention are in particular, that the underrun prevention unit adapts to variations that may occur during operational mode, for example, in situations when the frequency of the input or output ports f1 and f2 vary. This might happen due to running sorted chips at different speeds, running hosts with a changing clock rate, system tuning, power saving at lower frequency and turbo modes. Furthermore, the amount of data might or additional delays within the data transfer might vary for each transfer.

What is claimed is:

1. A device for parameter independent buffer underrun prevention in a data communication system comprising a buffer for compensating for a difference in the rate of flow of data having an write port for writing data into said buffer and a read port for reading data from said buffer, said device comprising:

a memory unit for storing a predetermined delay time, a counter for measuring said predetermined delay time, a signal generator for generating a signal enabling read access to said buffer after said delay time has passed, means for determining the length of a time gap between the completion of writing data into said buffer and completion of reading data from said buffer, a computing unit for decreasing the length of said predetermined delay time by a first value if the length of said time gap is larger than a specified tolerance value, and wherein said computing unit increases the length of said predetermined delay time by a second value if the length of said time gap is smaller than said specified tolerance value, further comprising means for storing the decreased or increased length of said predetermined delay in said memory unit, and wherein in said data communication system data packets of varying size are written into and read from said buffer and said data packets are classified according to their size into different packet classes, the device further comprising a first input port for receiving a class signal specifying said particular packet class and additional memory units for storing a designated predetermined delay time for each packet class, and further comprising a second input port for receiving an end-of-read signal signaling the instant of time when only a specified number of cycles are left before all data are read from said buffer, and further comprising a third input port for receiving a write signal signaling when data are written into said buffer, and wherein said means for determining the length of said time gap between the completion of writing data into said buffer and completion of reading data from said buffer is formed by a logical unit determining whether or not said end-of-read signal occurs while said write signal is still signaling that data are written into said buffer.

* * * * *